(No Model.)
C. S. MASON.
MUSIC CHART.
No. 375,496. Patented Dec. 27, 1887.
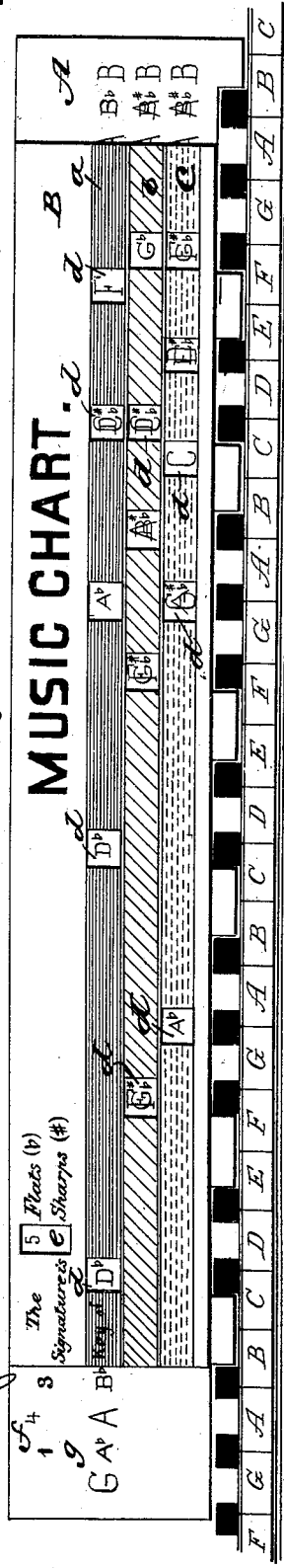
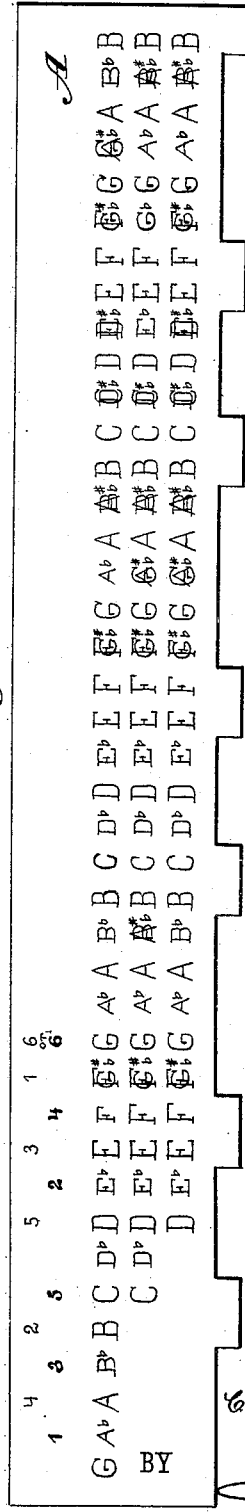
WITNESSES:
Otto Beyer
C. Sedgwick
INVENTOR:
C. S. Mason
BY Munn & Co.
ATTORNEYS.

UNITED STATES PATENT OFFICE.

CHARLES S. MASON, OF ORANGE, CALIFORNIA.

MUSIC-CHART.

SPECIFICATION forming part of Letters Patent No. 375,496, dated December 27, 1887.

Application filed April 16, 1887. Serial No. 235,106. (No model.)

*To all whom it may concern:*

Be it known that I, CHARLES S. MASON, of Orange, in the county of Los Angeles and State of California, have invented a new and Improved Music-Chart, of which the following is a specification, reference being had to the annexed drawings, forming a part thereof, in which—

Figure 1 is a front elevation of my improved music-chart, and Fig. 2 is a front elevation of the rear portion of the chart.

Similar letters of reference indicate corresponding parts in both views.

The object of my invention is to provide a simple and efficient device for use in connection with pianos and organs for transposing music from one key to another.

My invention consists in a card provided with projections upon one edge adapted to fit into the wider spaces between the black keys of the key-board to locate the chart with reference to the scale of the instrument in connection with which it is used, and carrying the letters in the scale, with appropriate indices and the numerals representing the signatures; also, in connection with the card, of an apertured card provided with stripes of different colors representing the different chords, apertures being made in the said stripes in the order required for showing the letters of the different chords of the various keys; also, an aperture for exposing to view the figures on the rear card representing the signatures.

The card A, forming the body of the chart, is provided with three rows of letters, representing in three series the notes of the scale. In practice I make the letters on the card A, representing the notes of the natural scale and sharps, larger than the letters representing flats, and to render the distinction still more complete I make the letters representing flats in red, so that when they are superposed upon black they may be readily distinguished. This occurs where one note sharped and a note above it flatted are made to occupy the same position on the scale. For example, "A-sharp" (printed in black) will occupy the same space with "B-flat" printed in red.

The card B, which is arranged to slide over the card A, is provided with three stripes, *a b c*, of different colors, the top line, *a*, representing the tonic or first chord, the second line, *b*, representing the subdominant chord, the line *c* representing the dominant chord. The stripes *a b c* correspond in position with the rows of letters upon the card A, and in the several stripes are rectangular apertures *d*, through which the letters upon the card A are displayed.

Near the upper edge of the card B, near one end, is formed an aperture, *e*, through which the two rows of figures *f g* on the card A may be displayed. Opposite the upper row of figures, and upon the face of the card B, is marked the word "Flats," and opposite the lower row of figures upon the front of the card B is marked the word "Sharps." These figures represent the signatures, and by sliding the card B over the card A until the figure representing the required signature appears in the aperture *e* the letters representing the notes for the tonic, subdominant, and dominant chords will appear through the apertures *d* of the card B.

The chart is to be placed upon the key-board of an organ or piano with the extensions on the lower edge of the card A fitting into the spaces between the black keys. Then move the card B until the cut-out space just to the right of the words "key of" is directly over the key giving the pitch desired as the tonic of the scale. The above-mentioned space and those to the right on the same line form the tonic chord, the subdominant and the dominant being on the lines below. To play, the first two left-hand letters of a chord are struck with the left hand and the remaining three letters with the right hand, alternately—*i. e.*, striking the accented beats of music with the left hand and the unaccented with the right hand. The three parts—the tonic, subdominant, and dominant—are played in the same manner. When you have the music, note the signature of the piece, and then move the card B until the same signature appears in the cut-out space to the right of "the signature is," and proceed as aforementioned.

My improved chart is rapid and positive in its operation.

Having thus described my invention, I claim as new and desire to secure by Letters Patent—

In a music-chart, the combination of the card A, bearing series of letters representing the notes of the scale, and series of figures representing the signatures and provided with projections upon one edge adapted to fit between the black keys of the instrument to which the chart is applied, and the card B, provided with stripes $a\ b\ c$ and apertures $d\ e$, substantially as described.

CHARLES S. MASON.

Witnesses:
ABEL FRAZIER,
C. E. AILES.